Oct. 21, 1969    T. M. OCHS    3,473,825
WHEEL FLAP
Filed Sept. 12, 1967
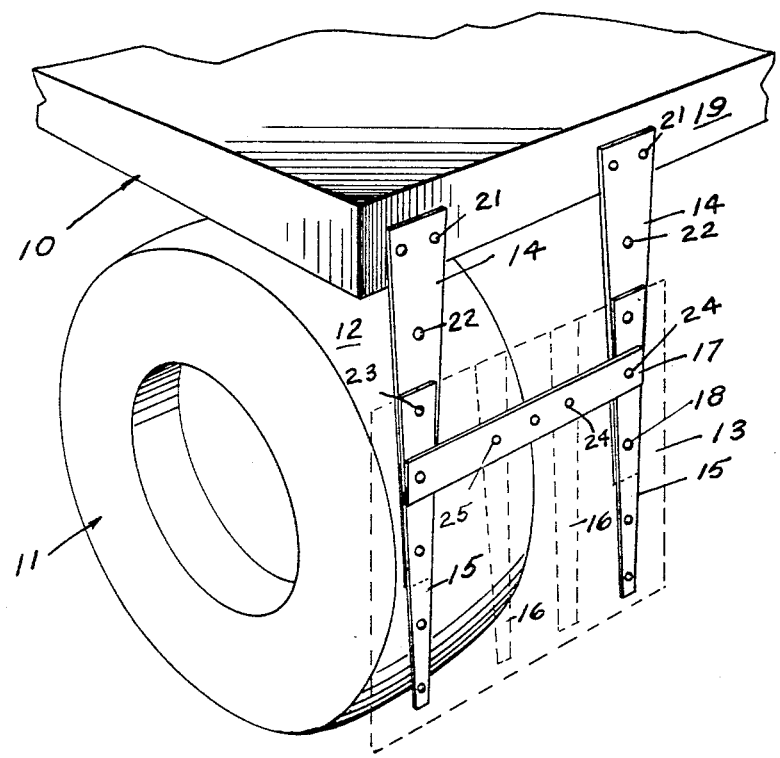
INVENTOR.
THADDEUS M. OCHS
BY
Charles L. Lovelock
attorney United States Patent Office 3,473,825
Patented Oct. 21, 1969

3,473,825
WHEEL FLAP
Thaddeus M. Ochs, 851 Rumsey Ave., Lawrence Park,
Erie, Pa. 16511
Filed Sept. 12, 1967, Ser. No. 667,247
Int. Cl. B62d 25/18; B62b 9/16
U.S. Cl. 280—154.5                               2 Claims

ABSTRACT OF THE DISCLOSURE

The present invention incorporates a mud flap made up of spaced plate-like members that can be fixed to the vehicle body at their upper ends and they extend downwardly and have spaced holes in them, and a lower bracket can be bolted to the upper plate-like bracket. A cross bracket is bolted to an intermediate part and holds the spaced brackets together, and the flap is bolted to the cross bar and to the bracket. By using this type of arrangement, the lower edge of the flap can be adjusted to the optimum position above the road and the entire flap can be made of flexible material which will not be subject to damage itself, nor will it damage other things with which it comes in contact. Several intermediate plates can be attached to the cross bar.

---

This invention relates to vehicle mud flaps, and more particularly, to the type of mud flaps suitable for trucks and the like to prevent them from throwing mud onto the trucks from the wheels.

It is, accordingly, an object of the invention to provide an improved support for flaps on trucks and the like.

Another object of the invention is to provide a support for flaps, which is simple in construction, economical to manufacture, and simple and efficient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The drawing shows an isometric view of a truck with the flap supported on it.

Now with more particular reference to the drawing, the vehicle shown is the back end of a flat bed truck; however, the flap is equally suitable for use on a rear end of a tractor suitable for pulling a semi-trailer or the like. The vehicle is indicated at 10 and it has a wheel 11 that has an outer periphery 12. The vehicle has a bed 19, and the upper bracket 14 attached to the vehicle bed by means of bolts supported in holes 21 which may be screwed into the rear end of a vehicle body 19, or they could be threaded bolts. The upper bracket 14 also has spaced holes 22 into which bolts may be placed to adjust the position of the lower bracket extensions 15. These lower bracket extensions 15 may be attached to the upper brackets 14 by means of bolts 23. The cross bar 17 is attached to the upper brackets 14 and the lower brackets 15 by means of bolts 24, and the bolts 24 extend through the cross bar 17 and through the upper bracket 14, as well as though the lower extensions 15.

Bolts 18 likewise hold members 14 and 15 together. Intermediate brackets 16 may be attached to the cross bar 17 by means of bolts 25, which may be adjustably supported as shown. The flaps 13 are attached to the upper bracket 14, to the lower extension 15, and to the intermediate bracket 16 and to the cross bar 17.

In use, the flaps will be 24 inches long or 36 inches long, depending on the particular design of vehicle. It can be adjusted to the optimum spacing above the ground to accomplish the optimum results.

The embodiments of the invention in which an exclusive property or privilege is claimed are defined as follows:

1. A sheet-like flap comprising, spaced plate-like upper brackets, said spaced upper brackets adapted to be fixed at their upper ends to a vehicle body and extending generally vertically downward in close proximity to the rear wheels of a vehicle, a cross bar extending transversely of said brackets intermediate the ends thereof, a sheet-like flap of flexible material fixed to said cross bar and to the brackets, said flap terminating adjacent the ground, plate-like lower extensions, one of said lower extensions attached to each of said brackets and terminating adjacent the lower edge of said flap, said cross bar attached to said upper brackets and to said extensions.

2. A sheet-like flap comprising,
spaced plate-like upper brackets,
said spaced upper brackets adapted to be fixed at their upper ends to a vehicle body and extending generally vertically downward in close proximity to the rear wheels of a vehicle,
a cross bar extending transversely of said upper brackets intermediate the ends thereof,
a sheet-like flap of flexible material fixed to said cross bar and to said brackets,
said flap terminating adjacent the ground,
plate-like lower extensions are provided,
one said lower extension being attached to each said bracket and terminating adjacent the lower edge of said flap,
said cross bar being attached to said upper brackets and to said extensions,
said upper brackets having spaced openings in their upper ends and being adapted to be attached to said vehicle body by means inserted in said spaced openings,
said lower extensions overlie said upper brackets and said lower extensions on upper brackets and said cross bars each having spaced holes therein,
and bolts extending through said holes.

References Cited
UNITED STATES PATENTS 2,699,955   1/1955   Gaves et al. _____ 280—154.5
2,777,710   1/1957   Panchesine _____ 280—154.5

BENJAMIN HERSH, Primary Examiner
ROBERT R. SONG, Assistant Examiner